US009395776B2

(12) United States Patent
Guo

(10) Patent No.: US 9,395,776 B2
(45) Date of Patent: Jul. 19, 2016

(54) COMPENSATING SYSTEM TIME LOSS

(71) Applicant: Lianhe Guo, Tomball, TX (US)

(72) Inventor: Lianhe Guo, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 612 days.

(21) Appl. No.: 13/926,908

(22) Filed: Jun. 25, 2013

(65) Prior Publication Data

US 2014/0379150 A1  Dec. 25, 2014

(51) Int. Cl.
| | |
|---|---|
| G06F 1/14 | (2006.01) |
| G06F 1/30 | (2006.01) |
| G05B 15/02 | (2006.01) |
| G06F 1/26 | (2006.01) |

(52) U.S. Cl.
CPC ........... *G06F 1/26* (2013.01); *G05B 15/02* (2013.01); *G06F 1/14* (2013.01); *G06F 1/30* (2013.01)

(58) Field of Classification Search
CPC ............ G06F 1/14; G06F 1/30; G05B 15/02; G04F 10/00; G04F 10/10; G04F 10/105
See application file for complete search history.

(56) References Cited

U.S. PATENT DOCUMENTS

| | | | |
|---|---|---|---|
| 3,581,196 A | 5/1971 | Spaid | |
| 3,932,847 A | 1/1976 | Smith | |
| 4,197,582 A | 4/1980 | Johnston et al. | |
| 4,742,424 A | 5/1988 | Kautzer et al. | |
| 4,879,647 A | 11/1989 | Yazawa | |
| 4,987,363 A | 1/1991 | Gibbs et al. | |
| 5,315,499 A * | 5/1994 | Bilas | H02B 1/42 700/22 |
| 5,500,834 A * | 3/1996 | Sakaki | G04F 10/10 368/107 |
| 5,504,878 A | 4/1996 | Coscarella et al. | |
| 6,005,384 A | 12/1999 | Hemminger et al. | |
| 6,665,620 B1 | 12/2003 | Burns et al. | |
| 6,826,128 B1 | 11/2004 | Berstis et al. | |
| 6,981,063 B1 | 12/2005 | Eggers et al. | |
| 7,009,379 B2 | 3/2006 | Ramirez | |
| 7,504,821 B2 | 3/2009 | Shuey | |

* cited by examiner

*Primary Examiner* — Manuel L Barbee
(74) *Attorney, Agent, or Firm* — Howard L. Speight, PLLC

(57) ABSTRACT

An apparatus includes a power supply for producing power. The apparatus further includes a first processor powered by the power supply. The apparatus further includes a first time-storage circuit coupled to the first processor. The first processor periodically reads a first-real-time-clock time from a first real-time clock and stores the first-real-time-clock time in the first time-storage circuit. The apparatus further includes a first power-monitoring circuit coupled to the first processor. The first power-monitoring circuit stores energy when a first power-being-monitored is producing power and dissipates energy at a first predictable rate when the first power-being-monitored is not producing power. The first processor is programmed to, upon recovery from a reset, read from the first power-monitoring circuit the energy stored by the first power-monitoring circuit. The first processor is further programmed to determine from the first stored energy reading a first power-out length of time that the first power-being-monitored was not producing power. The first processor is further programmed to determine that the first power-out length of time is less than a first threshold length of time. The first processor is further programmed to set a first processor time to the first-real-time-clock time stored in the first time-storage circuit plus the first power-out length of time.

20 Claims, 7 Drawing Sheets

COMPENSATING SYSTEM TIME LOSS

BACKGROUND

An oil well typically goes through a "completion" process after it is drilled. Casing is installed in the well bore and cement is poured around the casing. This process stabilizes the well bore and keeps it from collapsing. Part of the completion process involves using a perforating system to perforate the casing and cement so that fluids in the formations can flow through the cement and casing and be brought to the surface. The perforation process is often accomplished with shaped explosive charges in a perforation tool. These perforation charges are often fired by applying power from a battery housed in the perforation to the explosive charges tool upon command from operators on the surface. Multiple safeguards prevent unintended detonation of the explosive charges including pressure sensors, temperature sensors, and time delays, all of which are intended to insure that the perforating tool is at a desired depth before detonation commands from the surface will be accepted and acted upon. Time delays are often measured by battery-powered real-time clocks housed in the perforating tool. It is a challenge to maintain the accuracy of a real-time clock in a hostile environment in which a battery may be temporarily jarred from its seat causing a temporary power failure, real-time clock reset, and processor reset.

DETAILED DESCRIPTION

Figure 1:
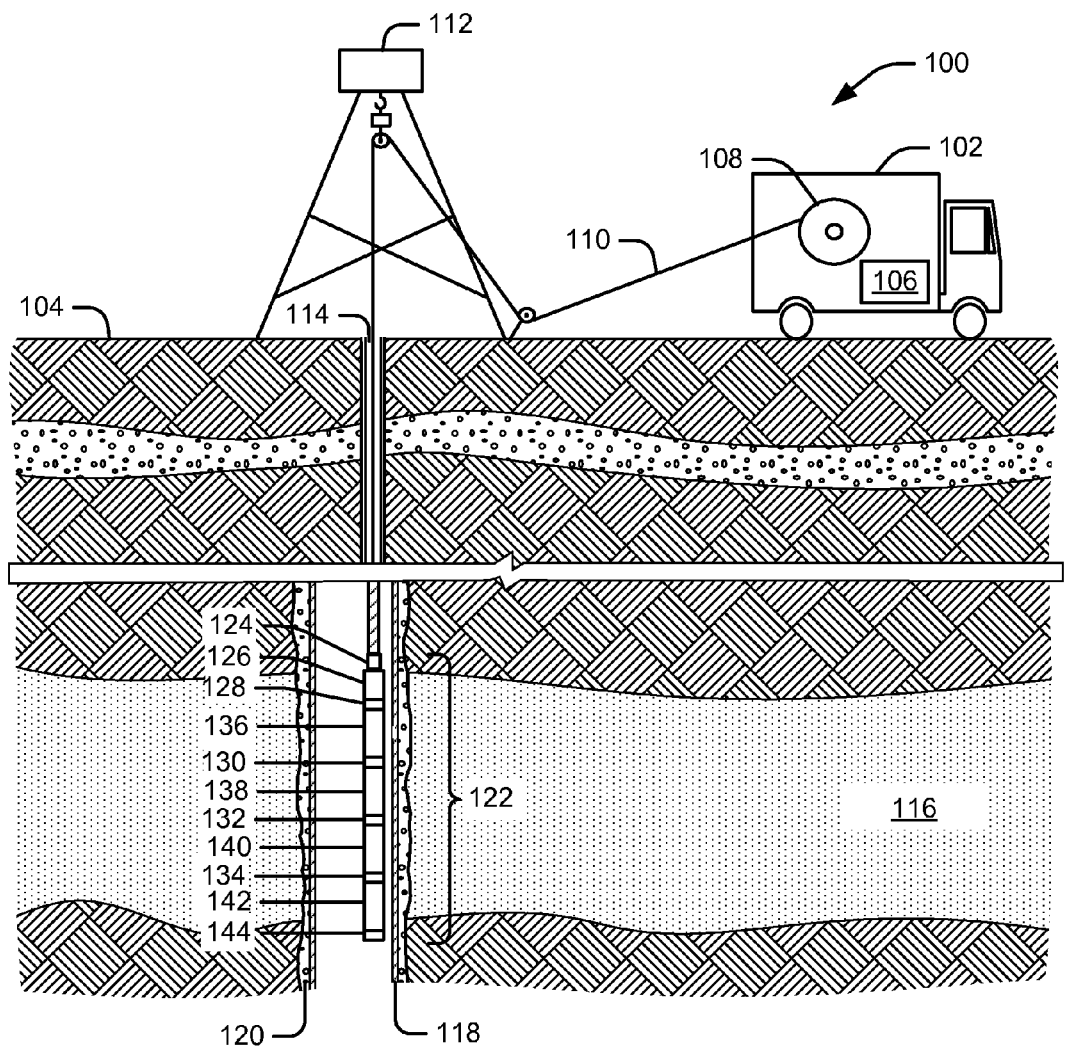
FIG. 1 illustrates a perforation system.

In one embodiment of a perforation system 100 at a drilling site, as depicted in FIG. 1, a logging truck or skid 102 on the earth's surface 104 houses a shooting panel 106 and a winch 108 from which a cable 110 extends through a derrick 112 into a well bore 114 drilled into a hydrocarbon-producing formation 116. In one embodiment, the derrick 112 is replaced by a truck with a crane (not shown). In one embodiment, a slickline apparatus is used instead of the wireline apparatus shown in FIG. 1. The well bore 114 is lined with casing 118 and cement 120. The cable 110 suspends a perforation tool 122 within the well bore 114.

Figure 2:
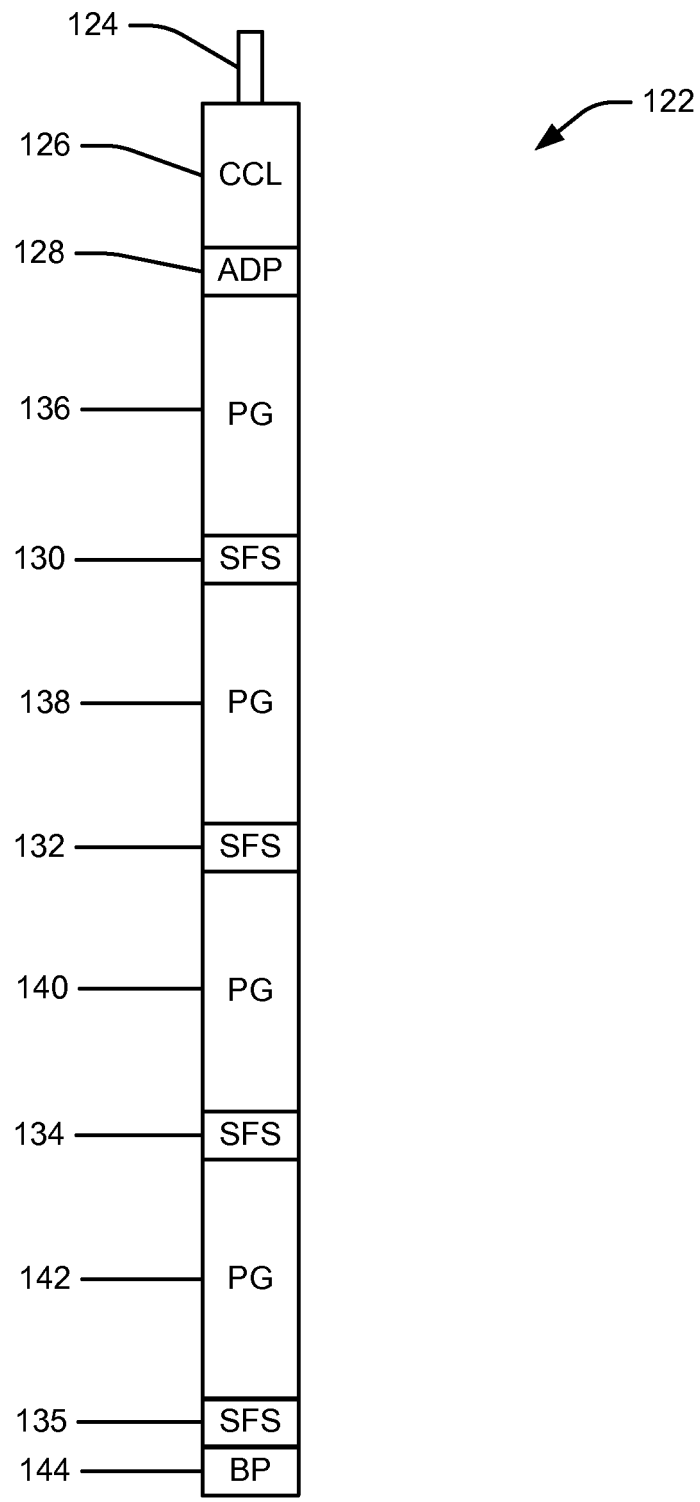
FIG. 2 illustrates a perforation apparatus.

In one embodiment shown in FIGS. 1 and 2, the perforation tool 122 includes a cable head/rope socket 124 to which the cable 110 is coupled. In one embodiment, an apparatus to facilitate fishing the perforation apparatus (not shown) is included above the cable head/rope socket 124. In one embodiment, the perforation tool 122 includes a casing collar locator ("CCL") 126, which facilitates the use of magnetic fields to locate the thicker metal in the casing collars (not shown). The information collected by the CCL can be used to locate the perforation tool 122 in the well bore 114. A gamma-perforator (not shown), which includes a CCL, may be included as a depth correlation device in the perforation tool 122.

In one embodiment, the perforation apparatus 122 includes an adapter ("ADP") 128 that provides an electrical and control interface between the shooting panel 106 on the surface and the rest of the equipment in the perforation tool 122.

In one embodiment, the perforation tool 122 includes a plurality of select fire subs ("SFS") 130, 132, 134, 135 and a plurality of perforation charge elements (or perforating gun or "PG") 136, 138, 140, and 142. In one embodiment, the number of select fire subs is one less than the number of perforation charge elements.

It will be understood by persons of ordinary skill in the art that the number of select fire subs and perforation charge elements shown in FIGS. 1 and 2 is merely illustrative and is not a limitation. Any number of select fire subs and sets of perforation charge elements can be included in the perforation tool 122.

In one embodiment, the perforation tool 122 includes a bull plug ("BP") 144 that facilitates the downward motion of the perforation tool 122 in the well bore 114 and provides a pressure barrier for protection of internal components of the perforation tool 122. In one embodiment, the perforation tool 122 includes magnetic decentralizers (not shown) that are magnetically drawn to the casing causing the perforation tool 122 to draw close to the casing as shown in FIG. 1. In one embodiment, a setting tool (not shown) is included to deploy and set a bridge or frac plug in the well bore 114.

Figure 3:
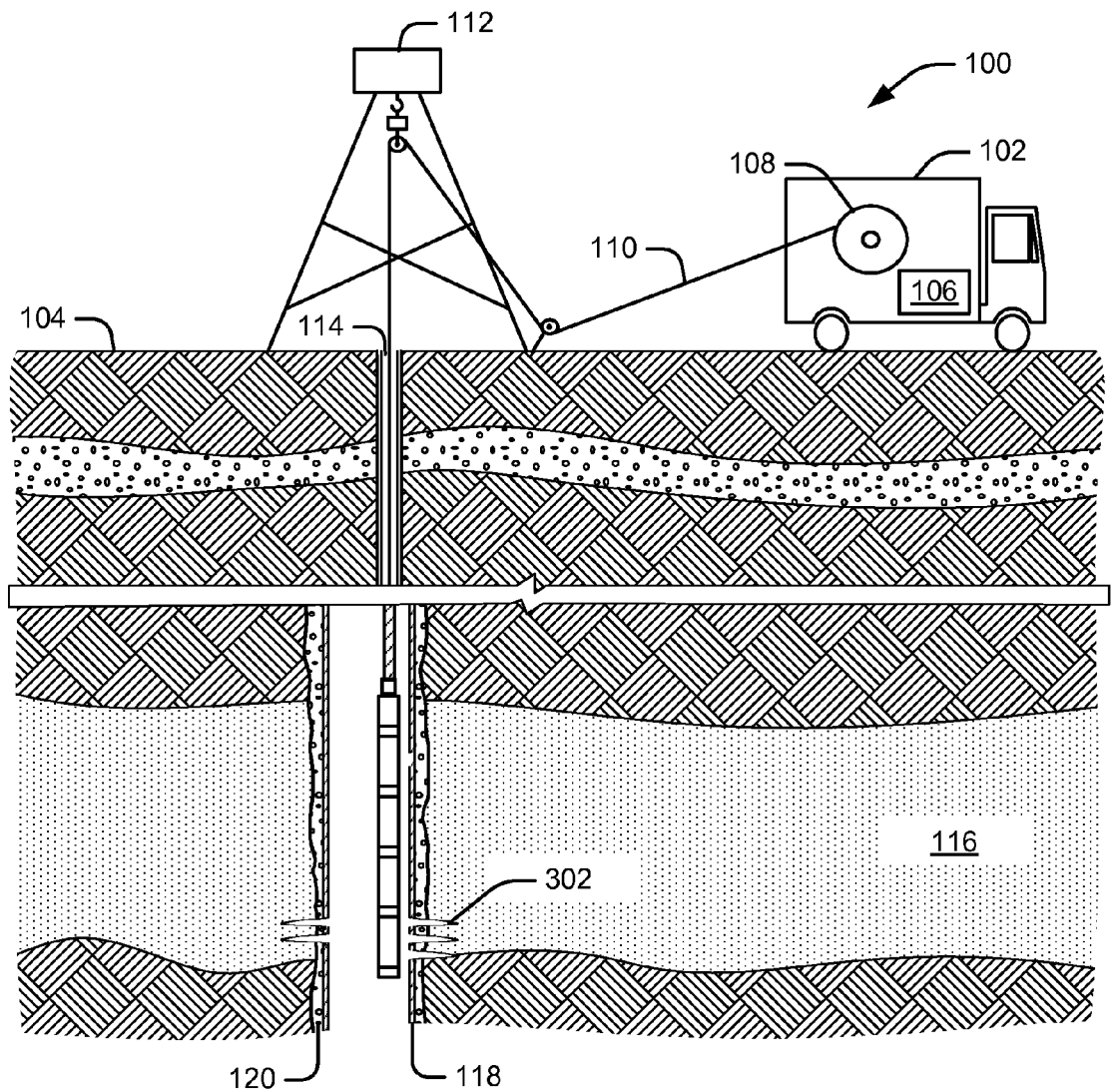
FIG. 3 illustrates the perforation system after one of the perforation charges has been fired.

FIG. 3 shows the result of the explosion of the lowest perforation charge element. Passages 302 (only one is labeled) have been created from the formation 116 through the concrete 120 and the casing 118. As a result, fluids can flow out of the formation 116 to the surface 104. Further, stimulation fluids may be pumped out of the casing 118 and into the formation 116 to serve various purposes in producing fluids from the formation 116.

Figure 4:
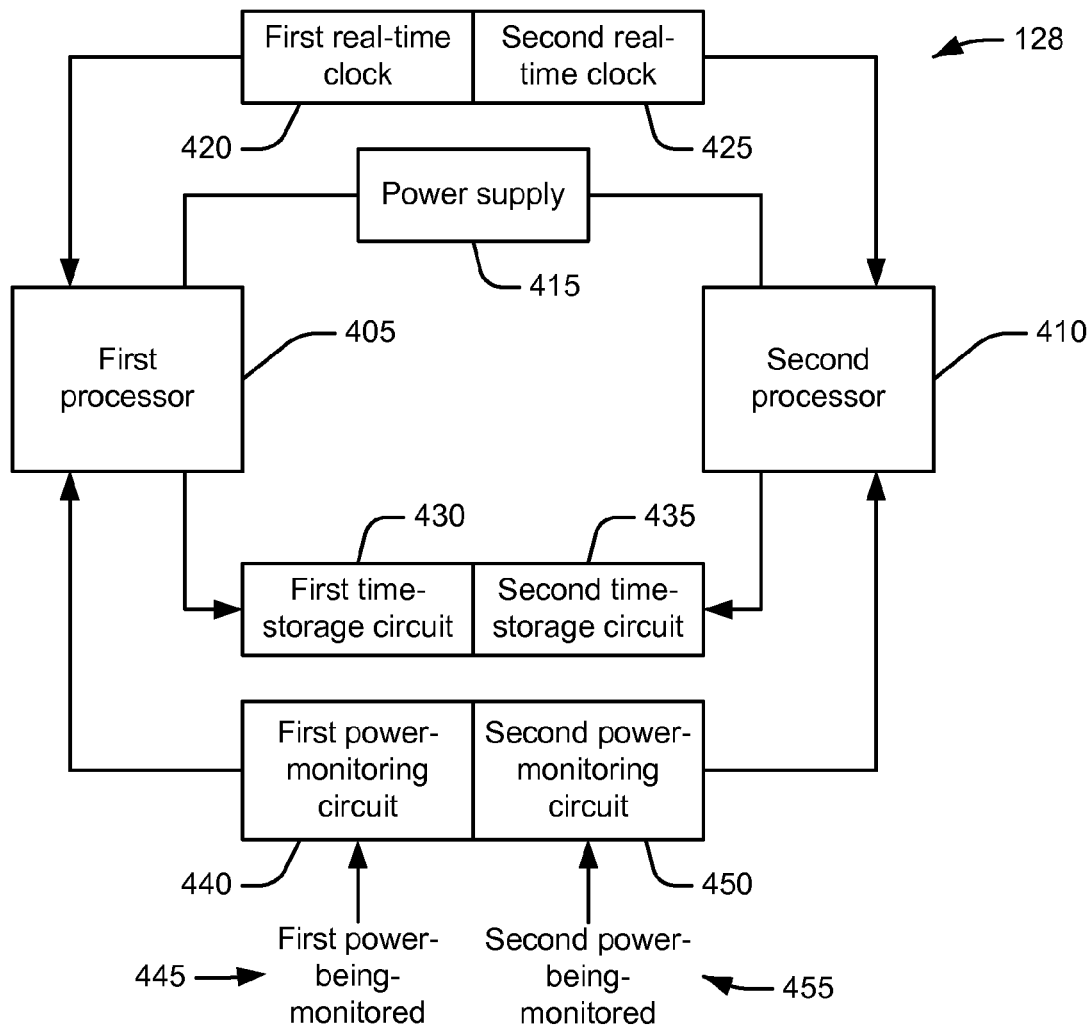
FIG. 4 illustrates circuitry to assist in recovering system time after a power loss.

In one embodiment, the adapter 128 includes, among other circuitry not pertinent to this application, circuitry to assist in recovering system time after a power loss, illustrated in FIG. 4. As discussed above, system time provides one of the safety measures used to reduce the likelihood of a undesired detonation. It may not be possible to synchronize system time in the perforation tool 122 with the surface due to insufficient or non-existent communication between the perforation tool 122 and the surface. For example, the bandwidth of a mud pulsing telemetry system may be insufficient to support the synchronization of system time.

In one embodiment, the circuitry to assist in recovering system time after a power loss, illustrated in FIG. 4, includes a first processor 405 and a second processor 410, both of which track system time. In one embodiment, the first processor 405 and the second processor 410 are powered by a power supply 415. In one embodiment, the first processor 405 is coupled to a first real-time clock 420 and the second processor 410 is coupled to a second real-time clock 425. In one embodiment, the first real-time clock 420 and the second real-time clock 425 are the same device. In one embodiment, the first real-time clock 420 and the second real-time clock 425 are powered by the power supply 415. In one embodiment, the first real-time clock 420 and the second real-time clock 425 are timers that provide a first-real-time-clock time and a second-real-time-clock time, respectively, from which the first processor 405 and the second processor 410 compute system time. In one embodiment, the first processor 405 reads or computes a first system time and the second processor 410 reads or computes a second system time. In one embodiment, the first system time and the second system time are equal. In one embodiment, the first system time and the second system time are not equal, for example, because of inexact synchronization between the first processor 405 and the second processor 410 in accessing the first real-time clock 420 and the second real-time clock 425, respectively.

In one embodiment, the first processor 405 stores the first system time in a first time-storage circuit 430. In one embodiment, the second processor 410 stores the second system time in a second time-storage circuit 435. In one embodiment, the first time-storage circuit 430 includes a nonvolatile memory that maintains its contents through a power failure. In one embodiment, the second time-storage circuit 435 includes a nonvolatile memory that maintains its contents through a power failure. In one embodiment, the first time-storage circuit 430 and the second time-storage circuit 435 are the same circuit. In one embodiment, the first time-storage circuit 430 and the second time-storage circuit 435 are different circuits. In one embodiment, the first time-storage circuit 430 and the second time-storage circuit 435 are powered by the power supply 415.

In one embodiment, a first power-monitoring circuit 440 monitors a first power-being-monitored 445 and interfaces with the first processor 405. In one embodiment, a second power-monitoring circuit 450 monitors a second power-being-monitored 455 and interfaces with the second processor 405. In one embodiment, the first power-monitoring circuit 440 and the second power-monitoring circuit 450 are the same circuit. In one embodiment, the first power-being-monitored 445 and the second power-being-monitored 455 are an output of the power supply 415.

In one embodiment, the first power-being-monitored 445 is an output of the first processor 405. That is, in one embodiment, the first processor 405 is an integrated circuit with pins, such as a TEXAS INSTRUMENTS® MSP 430, and the first power-being-monitored 445 is the output of a general purpose digital output pin that can be set under program control to a positive voltage (e.g., approximately 3 volts) or zero (i.e., approximately 0 volts).

In one embodiment, the second power-being-monitored 455 is an output of the second processor 410. That is, in one embodiment, the second processor 410 is an integrated circuit with pins, such as a TEXAS INSTRUMENTS® MSP 430, and the second power-being-monitored 455 is the output of a general purpose digital output pin that can be set under program control to a positive voltage (e.g., approximately 3 volts) or zero (i.e., approximately 0 volts).

In one embodiment, the first processor 405 and the second processor 410 are installed on a single circuit board (not shown) in the perforation tool 122. In one embodiment, the first real-time clock 420, the second real-time clock 425, the first time-storage circuit 430, the second time-storage circuit 435, the first power-monitoring circuit 440, and the second power-monitoring circuit 450 are installed on the single circuit board in the perforation tool 122.

Figure 5:
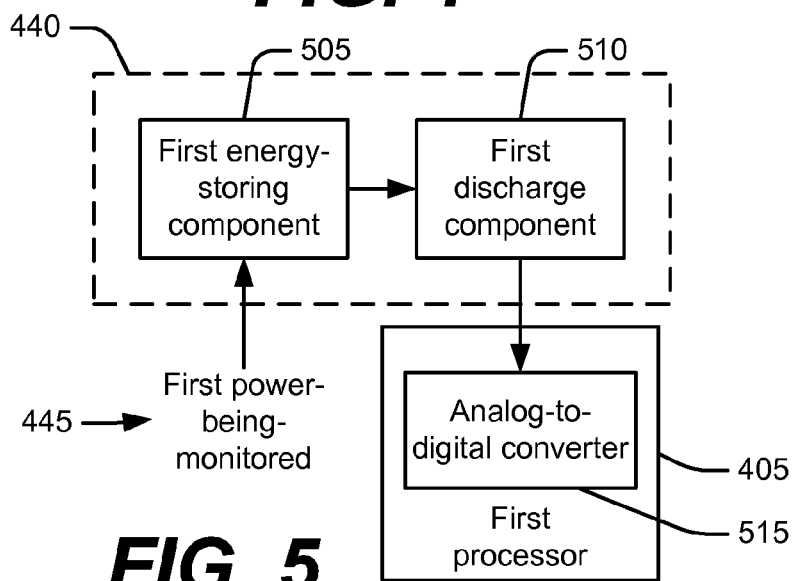
FIGS. 5 and 6 illustrate a power monitoring circuits.

In one embodiment, illustrated in FIG. 5, the first power-monitoring circuit 440 includes a first energy-storing component 505 coupled to the first power-being-monitored 445. In one embodiment, the first energy-storing component 505 is coupled to a first discharge component 510. In one embodiment, the first discharge component 510 includes an analog voltage output that is coupled to an analog-to-digital converter ("ADC") 515, which produces a digital representation of the analog voltage output and provides it to the first processor 405. In one embodiment, the ADC is part of the first processor 405.

In one embodiment, the second power-monitoring circuit 450 is identical to the first power-monitoring circuit 440 illustrated in FIG. 5.

Figure 6:
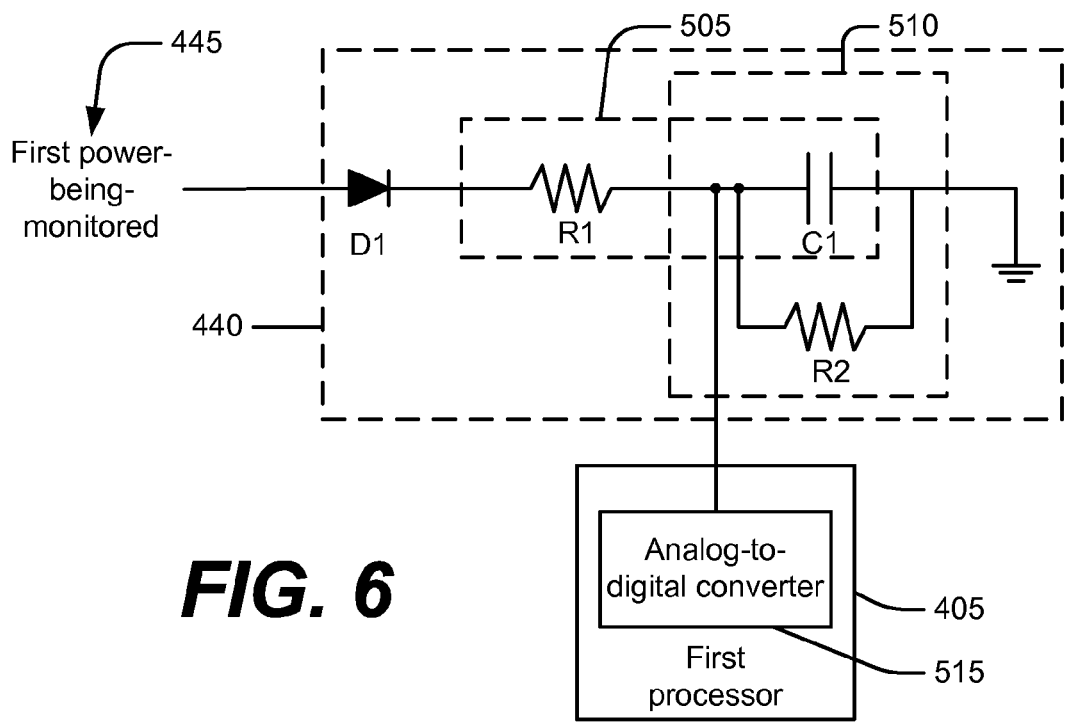

One embodiment of the first power-monitoring circuit 440, illustrated in FIG. 6, the first energy-storing component 505 includes a series combination of a resistor R1 and a capacitor C1 to ground. In one embodiment, the capacitor C1 is charged by the first power-being-monitored according to the R1C1 time constant. In one embodiment, R1 is a 1000 Ohm resister and C1 is a 4.7 microfarad capacitor. In one embodiment, the product of R1 and C1 (i.e., R1-C1) is in the range from 1 millisecond to 5 milliseconds. In one embodiment, the product of R1 and C1 is in the range from 0.1 milliseconds to 50 milliseconds. In one embodiment, the product of R1 and C1 is in the range from 0.01 milliseconds to 500 milliseconds.

In one embodiment, the first discharge component 510 includes a parallel combination of the capacitor C1 and a resistor R2. In one embodiment, when power is not being applied by the first power-being-monitored 445, the capacitor C1 discharges through the resistor R2. In one embodiment, R2 is a 100 k Ohm resistor. In one embodiment, the product of R2 and C1 (i.e., R2-C1) is in the range from 2 milliseconds to 1 second. In one embodiment, the product of R2 and C1 is in the range from 1 millisecond to 2 seconds. In one embodiment, the product of R2 and C1 is in the range from 0.5 milliseconds to 4 seconds.

In one embodiment, the ADC 515 pickoff is at the junction of the resisters R1 and R2 and the capacitor C1.

In one embodiment, a diode D1 acts as a switch to prevent current from flowing from the capacitor C1 to the first power-being-monitored when the capacitor C1 is being discharged. In one embodiment, the diode D1 is replaced with a relay (not shown) that closes when the first power-being-monitored 445 is supplying power and opens when the first power-being-monitored 445 is not supplying power.

In one embodiment, the capacitor C1 is replaced by another energy storage component, such as inductor (not shown).

In one embodiment, the second power-monitoring circuit 450 is similar to the first power-monitoring circuit 440.

Figure 7:
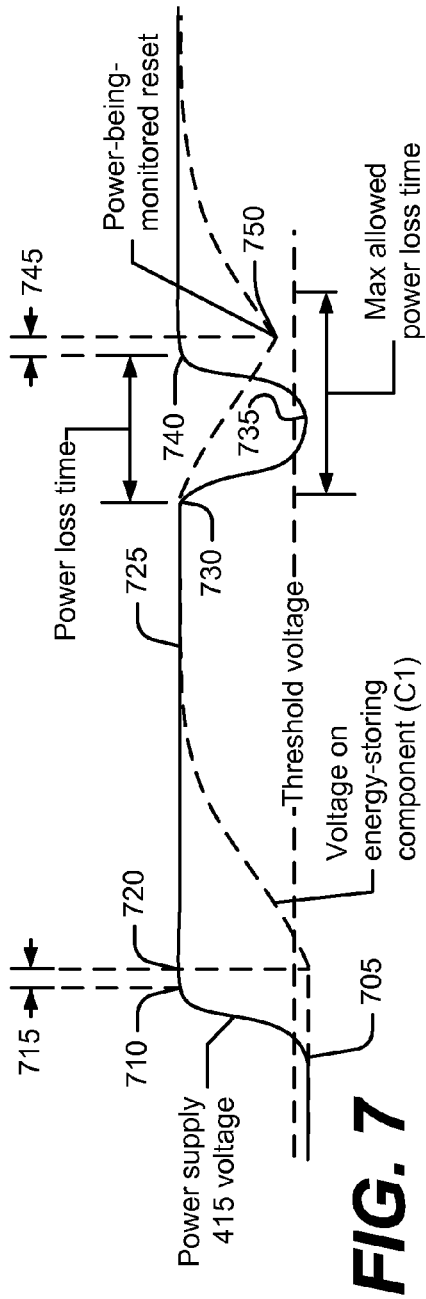
FIGS. 7 and 8 illustrate power loss thresholds.
Figure 8:
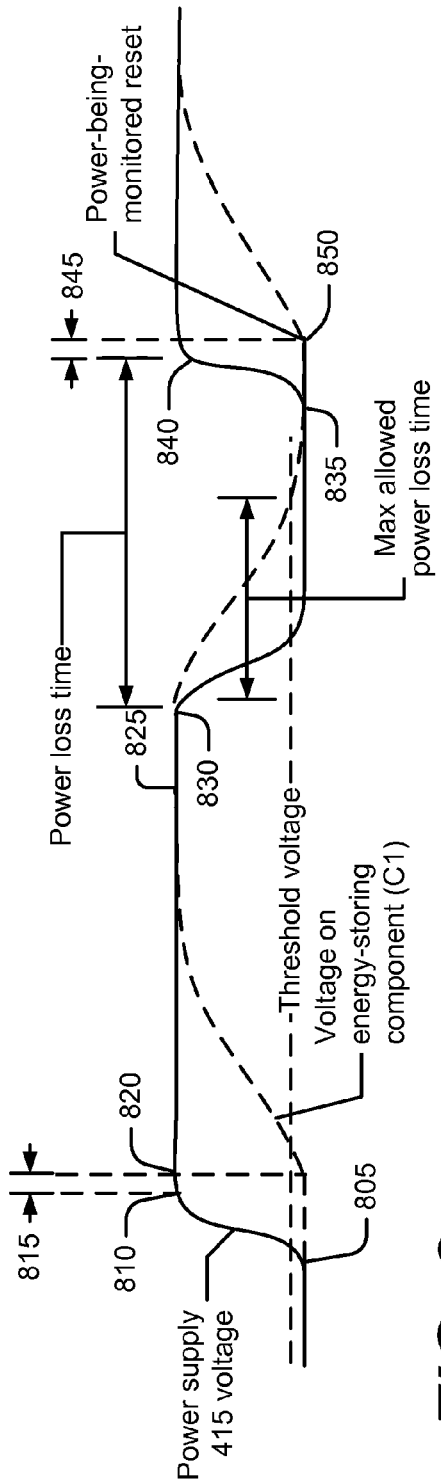

FIGS. 7 and 8 illustrate one embodiment of thresholds used to assist in recovering system time after a power loss. In one embodiment, the solid line in FIG. 7 represents the voltage supplied by the power supply 415. In one embodiment, the power supply 415 voltage is also referred to as the "power-being-monitored," which can be the first power-being-monitored 445 or the second power-being-monitored 455. In one embodiment, the dashed line represents the voltage on the energy-storing component (i.e., the capacitor C1).

In one embodiment, as shown in FIG. 7, the power supply 415 is powered on at point 705. The voltage provided by the power supply rises to a voltage at which the first processor 405 begins processing at point 710. In one embodiment, in which the power-being-monitored is an output of the first processor 405, there is a delay 715 between point 710, when the first processor 405 begins processing, and the point 720 when the first processor 405 power-being-monitored output is set and the capacitor C1 begins to charge. During that time, the first processor 405 performs its power on self test ("POST") processing, its initialization, and other start up processing. In one embodiment, the delay 715 is 10 microseconds. In one embodiment, the delay 715 is 1 microsecond. In one embodiment, the delay 715 is 100 nanoseconds. In embodiments in which the power-being-monitored is the power supply 415 voltage, there is no delay 715, and, in some embodiments, the capacitor C1 will begin charging before point 710 is reached. In one embodiment, the voltage across the capacitor C1 begins to rise at point 720 but rises more slowly than the power supply 415 voltage and arrives at its maximum value at point 725, a period of time after point 720 that is dictated by the R1C1 time constant. A power loss occurs at point 730 causing the voltage provided by the power supply 415 to drop back to the level of point 705. In one embodiment, the voltage across the capacitor C1 drops at the rate dictated by the R2C1 time constant. Power is restored at point 735 and returns to the voltage at which the first processor 405 begins processing at point 740. In one embodiment, in which the power-being-monitored is an output of the first processor, there is a delay 745 after point 740 before the power-being-monitored is reset. During the delay 745, the voltage across the capacitor C1 continues to fall until the power-being monitored is reset at point 750. The voltage across the capacitor then rises as shown in FIG. 7. In embodiments in which the power-being-monitored is the power supply 415 voltage, there is no delay 745, and, in some embodiments, the capacitor C1 will begin recharging before point 740 is reached beginning, for example, when power is restored at point 735.

In one embodiment, the voltage across the capacitor C1 stays above a threshold voltage, as represented by a horizontal dashed line in FIG. 7, and is above the threshold level at reset (i.e., at point 750). In one embodiment, the threshold voltage is 0.25 volts. In one embodiment, the threshold voltage is 0.1 volt. In one embodiment, the threshold voltage is 0.05 volts. In one embodiment, the threshold voltage establishes the time loss that can be recovered. In one embodiment, that amount of time increases as the threshold voltage decreases.

FIG. 8 is similar to FIG. 7 except that the power loss time in FIG. 8 is longer than the power loss time in FIG. 7. As in FIG. 7, the solid line represents the voltage supplied by the power supply 415. As in the discussion of FIG. 7, the power supply 415 voltage is also referred to as the power-being-monitored, which can be the first power-being-monitored 445 or the second power-being-monitored 455. The dashed line represents the voltage on the energy-storing component (i.e., the capacitor C1). In one embodiment, as shown in FIG. 8, the power supply 415 is powered on at point 805. The voltage provided by the power supply 415 rises to a voltage at which the first processor 405 begins processing at point 810. In one embodiment, in which the power-being-monitored is an output of the first processor 405, there is a delay 815 between point 810, when the first processor 405 begins processing, and the point 820 when the first processor 405 power-being-monitored output is set and the capacitor C1 begins to charge. During that time, the first processor 405 performs its power on self test ("POST") processing, its initialization, and other start up processing. In one embodiment, the delay 815 is 10 microseconds. In one embodiment, the delay 815 is 1 microsecond. In one embodiment, the delay 815 is 100 nanoseconds. In embodiments in which the power-being-monitored is the power supply 415 voltage, there is no delay 815, and, in some embodiments, the capacitor C1 will begin charging before point 810 is reached. In one embodiment, the voltage across the capacitor C1, represented by the dashed line, begins to rise at point 820 but rises more slowly than the power supply 415 voltage and arrives at its maximum value at point 825, a period of time after point 820 that is dictated by the R1C1 time constant. A power loss occurs at point 830 causing the voltage provided by the power supply 415 to drop back to the level of point 805. In one embodiment, the power across the capacitor C1 drops at the rate dictated by the R2C1 time constant. Power is restored at point 835 and returns to the voltage at which the first processor 405 begins processing at point 840. In one embodiment, in which the power-being-monitored is an output of the first processor, there is a delay 845 after point 840 before the power-being-monitored is reset. During the delay 845, the voltage across the capacitor C1 continues to fall until the power-being monitored is reset at point 850. The voltage across the capacitor then rises as shown in FIG. 8. In embodiments in which the power-being-monitored is the power supply 415 voltage, there is no delay 845, and, in some embodiments, the capacitor C1 will begin recharging before point 840 is reached beginning, for example, when power is restored at point 835.

In one embodiment, the voltage across the capacitor C1 falls below the threshold voltage, as shown on FIG. 8, and is below the threshold level at reset of the power-being-monitored. In one embodiment in which the power-being-monitored is an output of the first processor 405, the first processor 405 may not reset its output (and thus the power-being-monitored) if it determines that the voltage across the capacitor C1 is below the threshold voltage. In that case, in one embodiment, the voltage on the capacitor C1 would not rise as shown in FIG. 8 after point 850 and would instead stay at the level shown at point 850.

In one embodiment, in which the power-being monitored is the power supply 415 voltage, the capacitor C1 will begin to recharge when power supply 415 begins supplying power, i.e., at point 835 in FIG. 8, and the first processor 405 will not read the voltage across the capacitor C1 until it has recharged for a period of time, e.g. from point 835 to point 850. In that case, the voltage across the capacitor C1 may have risen to a value greater than the threshold voltage which would produce a false indication that system time is recoverable. To avoid the false indication, in one embodiment before testing the voltage read from the capacitor C1 against the first threshold (block 925 in FIG. 9 below) the first processor 405 will subtract an estimate of the amount of charge on the capacitor C1 between the time the power supply 415 was powered up and the time the voltage on the capacitor C1 was read. In one embodiment, the estimate based on experimental data compiled through tests charging the capacitor C1 when the power supply 415 powers up. In one embodiment, this correction is only made if the voltage read from the capacitor C1 is above the first threshold. In one embodiment, this correction is not made if the voltage read from the capacitor C1 is a substantial amount above the first threshold. In one embodiment, the substantial amount is 2 times the first threshold. In one embodiment, the substantial amount is 4 times the first threshold. In one embodiment, the substantial amount is 8 times the first threshold.

Figure 9:
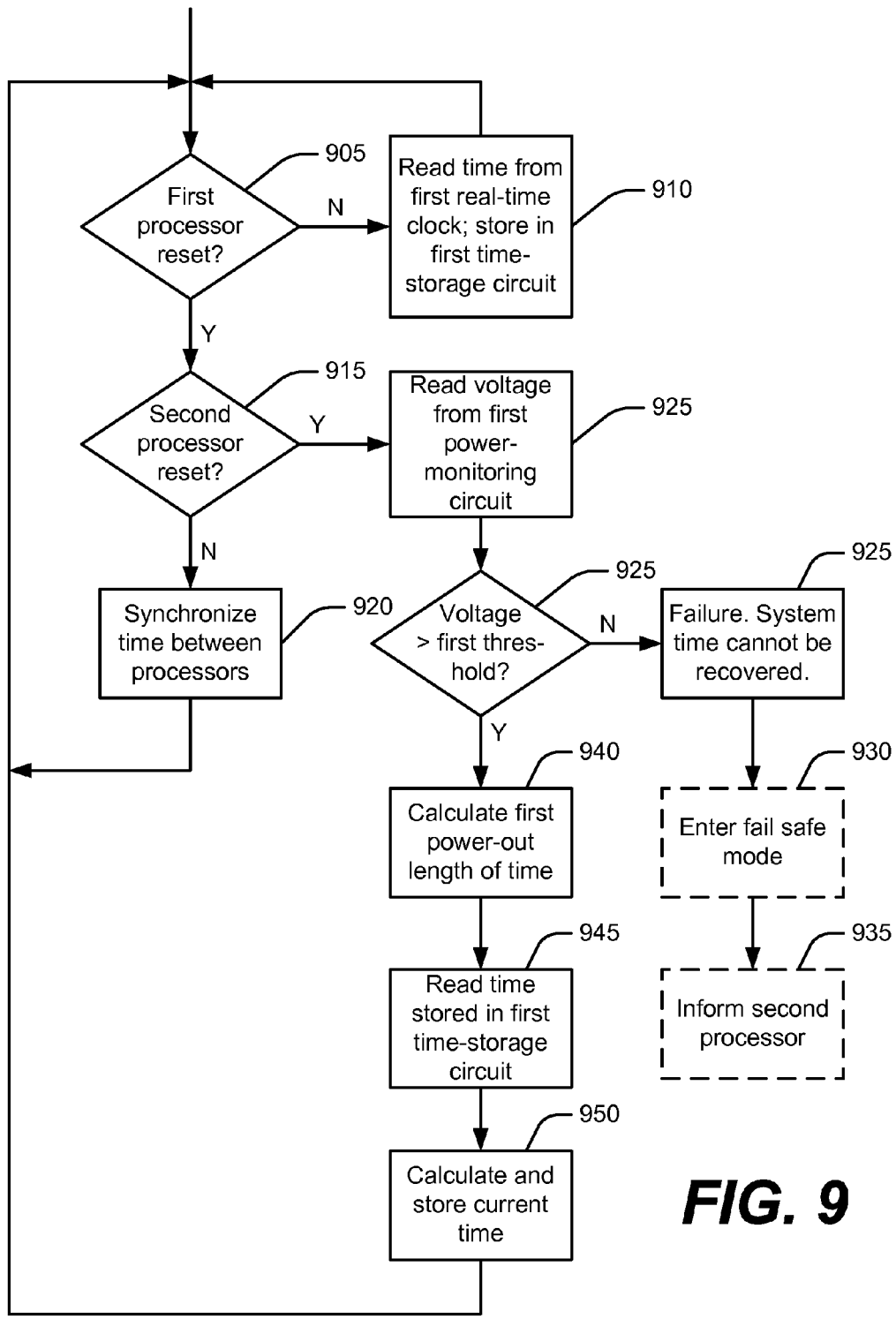
FIG. 9 is a flow chart.

In one embodiment, the first processor 405 and the second processor 410 execute similar processes, as shown in FIG. 9, to provide the system time loss compensation functionality. A description of one embodiment of the processing performed by the first processor 405 will follow. In one embodiment, one embodiment of the processing by the second processor 410 is identical except that references to "first processor" are changed to "second processor" and references to "second processor" are changed to "first processor."

In one embodiment, first processor 405 determines if it is recovering from a reset (block 905). In one embodiment, this is done by periodically checking a reset vector in memory accessible to the first processor 405. In one embodiment, the reset vector is "0" if a reset has not occurred and is not "0" if a reset has occurred. In one embodiment, if the reset vector has a particular value (e.g. "00010000"), the first processor 405 has been reset because of a power failure.

In one embodiment, if the first processor 405 has not been reset or has been reset for any reason other than a power failure (the "N" branch from block 905), the first processor reads time from the first real-time clock 420, processes it as necessary, and stores the processed time in the first time-storage circuit 430 (block 910). In one embodiment, processing will then loop back to block 905. In one embodiment, blocks 905 and 910 periodically refresh system time as stored in the first time-storage circuit. In one embodiment, the refresh rate is greater than one refresh per second. In one embodiment, the refresh rate is greater than 10 refreshes per second. In one embodiment, the refresh rate is greater than 100 refreshes per second.

In one embodiment, if the first processor 405 has been reset because of a power failure (the "Y" branch from block 905), the processor communicates with the second processor 410 to determine if the second processor 410 has experienced a reset (block 915). If the second processor 410 communicates that it has not experienced a reset (the "N" branch from block 915), indicating that the second processor 410 still has good system time, the first processor 405 synchronizes time between the first processor 405 and the second processor 410 by requesting system time from the second processor 410 and storing the time it receives in the first time-storage circuit 430.

In one embodiment, if the second processor 410 communicates that it has experienced a reset ("Y" branch from block 915), which indicates that both the first processor 405 and the second processor 410 no longer have good system time, the first processor 405 reads a voltage from the first power-monitoring circuit 440 through the analog-to-digital converter 515 (block 925). The first processor 405 then tests the voltage it just read (as adjusted as described above) against a first threshold (block 925). In one embodiment, the first threshold is the threshold voltage shown in FIGS. 7 and 8. In one embodiment, the first processor 405 has a first threshold and the second processor 410 has a second threshold.

In one embodiment, the first threshold is set so that if the voltage across capacitor C1 is allowed to decay according to the R2C1 time constant for the up to the max allowed power loss time (see FIG. 7), the voltage across the capacitor C1 will still be measurable with reasonable accuracy. For example, if the analog-to-digital converter 405 has a 12 bit resolution and a 1.5 volt reference, the first threshold can be as low as 0.37 millivolts ("mV") (1.5 volts/$2^{12}$). In one embodiment, "reasonable accuracy" means that the voltage across the capacitor C1 can be measured within 1 mV. In one embodiment, "reasonable accuracy" means that the voltage across the capacitor C1 can be measured within 10 mV. In one embodiment, "reasonable accuracy" means that the voltage across the capacitor C1 can be measured within 100 mV. If the voltage across capacitor C1 is allowed to decay for longer than the max allowed power loss time, then, in one embodiment, measurement of the voltage across the capacitor Cl, and thus the adjustment to system time based on that measurement, is deemed to be untenable. In one embodiment, the second threshold is determined in a similar way as the first threshold. In one embodiment, the first threshold is the same as the second threshold. In one embodiment, the first threshold and the second threshold are different.

In one embodiment, if the measured voltage is not greater than the first threshold (the "N" branch from block 925), the attempt to compensate for system time loss is deemed a failure and the first processor determines that system time cannot be recovered (block 930). In one embodiment, the first processor 405 enters a fail safe mode (block 930) in which the perforating tool cannot be fired. In one embodiment, the first processor 405 informs the second processor 410 that the first processor has entered a fail safe mode (block 935). In one embodiment, the second processor 410 enters a fail safe mode upon learning that the first processor 405 has entered a fail safe mode even if it has been successful in compensating for the time loss. In one embodiment, the second processor 410 does not enter a fail safe mode upon learning that the first processor 405 has entered the fail safe mode if the voltage read by the second processor from the second power-monitoring-circuit is greater than the second threshold by a sufficient amount. In one embodiment, the sufficient amount is 1 mV. In one embodiment, the sufficient amount is 2 mV. In one embodiment, the sufficient amount is 3 mV.

In one embodiment, if the measured voltage is greater than the first threshold ("Y" branch from block 925), the first processor calculates the first power-out length of time (labeled "power loss time" on FIGS. 7 and 8) (block 940). In one embodiment in which the first energy-storing element includes a capacitor, the first processor calculates the power loss time as follows:

$$\text{power loss time} = R_1 C_1 \ln \frac{V_0}{V_t}$$

where:
V0 is the known voltage (or the voltage measured voltage) across the capacitor C1 at time 715 or 815, and
Vt is the voltage measured across the capacitor C1 at reset time 725 or 825, or shortly thereafter as described above.

In one embodiment, the first processor 905 reads the time stored in the first time-storage circuit 430 (block 945), which is the last system time stored before the reset. In one embodiment, the first processor 405 calculates the current system time by adding the calculated power loss time to the retrieved system time and stores the result in the first time-storage circuit (block 950). In one embodiment in which the power-being-monitored is the power supply 415 voltage, before saving the result the first processor subtracts from the calculated current system time an amount representing an estimate of the time between restoration of power to the power supply 415 and when the first processor read the voltage across the capacitor Cl, as discussed above. The first processor 905 then reenters the reset-checking loop at block 905.

In one embodiment, the software or firmware to perform the processing described above in connection with FIG. 9 is stored on memory (not shown) in the first processor 405 integrated circuit and in the second processor 410 integrated circuit or in an external memory (not shown) on the same circuit board as the first processor 405 and the second processor 410 or on a different circuit board in the perforation tool 122. In one embodiment, the software or firmware is provided on non-transitory computer-readable media, such as a compact disk, a DVD, or a USB drive, and is imported to the memory through an input/output interface.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. An apparatus comprising:
a power supply for producing power,
a first processor powered by the power supply;
a first time-storage circuit coupled to the first processor, wherein the first processor periodically reads a first-real- time-clock time from a first real-time clock and stores the first-real-time-clock time in the first time-storage circuit;
a first power-monitoring circuit coupled to the first processor, wherein the first power-monitoring circuit stores energy when a first power-being-monitored is producing power and dissipates energy at a first predictable rate when the first power-being-monitored is not producing power;
wherein the first processor is programmed to:
upon recovery from a reset, read from the first power-monitoring circuit the energy stored by the first power-monitoring circuit,
determine from the first stored energy reading a first power-out length of time that the first power-being-monitored was not producing power,
determine that the first power-out length of time is less than a first threshold length of time, and
set a first processor time to the first-real-time-clock time stored in the first time-storage circuit plus the first power-out length of time.

2. The apparatus of claim 1 wherein the first processor is an integrated circuit having pins and the first power-being-monitored is provided by a pin on the first processor integrated circuit.

3. The apparatus of claim 1 wherein the first power-monitoring circuit comprises:
a first energy-storing component coupled to the first power-being-monitored; and
a first discharge component coupled to the first energy storing component.

4. The apparatus of claim 3 wherein the first power-being-monitored is selected from a group consisting of the power supply and the first processor.

5. The apparatus of claim 3 wherein the first energy storing component is selected from a group consisting of a capacitor and an inductor.

6. The apparatus of claim 1 further comprising a first analog to digital converter coupled to the first processor and the first power-monitoring circuit through which the processor reads the energy stored by the first power-monitoring circuit.

7. The apparatus of claim 1 further comprising:
a second processor coupled to the power supply and the first processor;
wherein the second processor, upon recovery from a reset, communicates with the first processor and determines that the first processor has not experienced a reset, and, as a result, acquires current time from the first processor.

8. The apparatus of claim 7 wherein:
the first processor is installed on a circuit board in a perforation tool; and
the second processor is installed on the circuit board in the perforation tool.

9. The apparatus of claim 1 further comprising:
a second processor powered by the power supply and coupled to the first processor;
a second time-storage circuit coupled to the second processor, wherein the second processor periodically reads a second-real-time-clock time from a second real-time clock and stores the second-real-time-clock time in the second time-storage circuit;
a second power-monitoring circuit coupled to the second processor, wherein the second power-monitoring circuit stores energy when a second power-being-monitored is producing power and dissipates energy at a second predictable rate when the second power-being-monitored is not producing power;
wherein the second processor is programmed to:
upon recovering from a reset, determine by communicating with the first processor that the first processor also experienced a reset;
read from the second power-monitoring circuit the energy stored by the second power-monitoring circuit,
determine from the second stored energy reading a second power-out length of time that the second power-being-monitored was not producing power,
determine that the second power-out length of time is greater than a second threshold length of time, and
enter a fail-safe mode.

10. The apparatus of claim 9 wherein:
the second processor is further programmed to inform the first processor that the second processor has entered the fail-safe mode, resulting in the first processor entering a fail-safe mode.

11. A method comprising:
a first processor, which is coupled to a power supply, a real-time clock, and a first time-storage circuit, determining that it is recovering from a reset, and in response to that determination:
the first processor determining that a second processor, to which the first processor is coupled by a system bus, has also experienced a reset, and in response to that determination:
the first processor reading a voltage from a first power-monitoring circuit, wherein the first power-monitoring circuit stores energy when a first power-being-monitored is producing power and dissipates energy at a first predictable rate when the first power-being-monitored is not producing power;
the first processor determining that the voltage read from the first power-monitoring circuit is greater than a first threshold, and in response to that determination:
the first processor calculating a first power-out length of time from:
the voltage read from the first power-monitoring circuit, and
a voltage expected to be read from the first power-monitoring circuit when there has been no interruption in power from the first power-being-monitored;
the first processor calculating a first system time from a time read from a first time-storage circuit and the first power-out length of time; and
the first processor storing the first system time in the first time-storage circuit.

12. The method of claim 11 further comprising:
subtracting from the voltage read an estimate of the increase in voltage readable from the first power-monitoring in the time between a restoration of power to the power supply and the first processor reading the voltage from the first power-monitoring circuit.

13. The method of claim 12 further comprising:
performing the subtracting element only if the voltage read is greater than the first threshold.

14. The method of claim 11 further comprising:
the second processor, which is coupled to the power supply, a second real-time clock, and a second time-storage circuit, determining that it is recovering from a reset, and in response to that determination:
the second processor determining that the first processor is also recovering from a reset;

the second processor reading a voltage from a second power-monitoring circuit, wherein the second power-monitoring circuit stores energy when a second power-being-monitored is producing power and dissipates energy at a second predictable rate when the second power-being-monitored is not producing power;

the second processor determining that the voltage read from the second power-monitoring circuit is greater than a second threshold, and in response to that determination:

the second processor calculating a second time loss from:

the voltage read from the second power-monitoring circuit, and a second voltage expected to be read from the second power-monitoring circuit when there has been no interruption in power from the second power-being-monitored;

the second processor calculating a second system time from a time read from the second time-storage circuit and the second time loss; and the second processor storing the second system time in the second time-storage circuit.

15. The method of claim 14 further comprising:

the first processor periodically reading a periodically-read first-real-time-clock time from the first real-time clock;

the first processor storing the periodically-read first-real-time-clock time in the first time-storage circuit;

the second processor periodically reading a periodically-read second-real-time-clock time from the second real-time clock; and the second processor storing the periodically-read second-real-time-clock time in the second time-storage circuit.

16. A computer program stored in a non-transitory computer-readable storage medium, the program comprising executable instructions that cause a first processor, which is coupled to a power supply, a real-time clock, and a first time-storage circuit, to:

determine that it is recovering from a reset, and in response to that determination:

determine that a second processor, to which the first processor is coupled by a system bus, has also experienced a reset, and in response to that determination:

read a voltage from a first power-monitoring circuit, wherein the first power-monitoring circuit stores energy when a first power-being-monitored is producing power and dissipates energy at a first predictable rate when the first power-being-monitored is not producing power;

determine that the voltage read from the first power-monitoring circuit is greater than a first threshold, and in response to that determination:

calculate a first power-out length of time from:

the voltage read from the first power-monitoring circuit, and a voltage expected to be read from the first power-monitoring circuit when there has been no interruption in power from the first power-being-monitored;

calculate a first system time from a time read from a first time-storage circuit and the first power-out length of time; and store the first system time in the first time-storage circuit.

17. The computer program of claim 16, wherein the computer program further comprises executable instructions that cause the processor to:

subtract from the voltage read an estimate of the increase in voltage readable from the first power-monitoring in the time between a restoration of power to the power supply and the first processor reading the voltage from the first power-monitoring circuit.

18. The computer program of claim 17, wherein the computer program further comprises executable instructions that cause the processor to:

perform the subtracting element only if the voltage read is greater than the first threshold.

19. The computer program of claim 16 further comprising executable instructions that cause a second processor, which is coupled to the power supply, a second real-time clock, and a second time-storage circuit, to:

determine that it is recovering from a reset, and in response to that determination:

determine that the first processor is also recovering from a reset;

read a voltage from a second power-monitoring circuit, wherein the second power-monitoring circuit stores energy when a second power-being-monitored is producing power and dissipates energy at a second predictable rate when the second power-being-monitored is not producing power;

determine that the voltage read from the second power-monitoring circuit is greater than a second threshold, and in response to that determination:

calculate a second time loss from:

the voltage read from the second power-monitoring circuit, and a second voltage expected to be read from the second power-monitoring circuit when there has been no interruption in power from the second power-being-monitored;

calculate a second system time from a time read from the second time-storage circuit and the second time loss; and storing the second system time in the second time-storage circuit.

20. The computer program of claim 19 further comprising executable instructions that cause:

the first processor to periodically read a periodically-read first-real-time-clock time from the first real-time clock;

the first processor to store the periodically-read first-real-time-clock time in the first time-storage circuit;

the second processor to periodically read a periodically-read second-real-time-clock time from the second real-time clock; and the second processor to store the periodically-read second-real-time-clock time in the second time-storage circuit.

* * * * *